G. W. WOODWARD & J. E. JEFFORDS.
TEA STEEPING DEVICE.
No. 186,656. Patented Jan. 23, 1877.
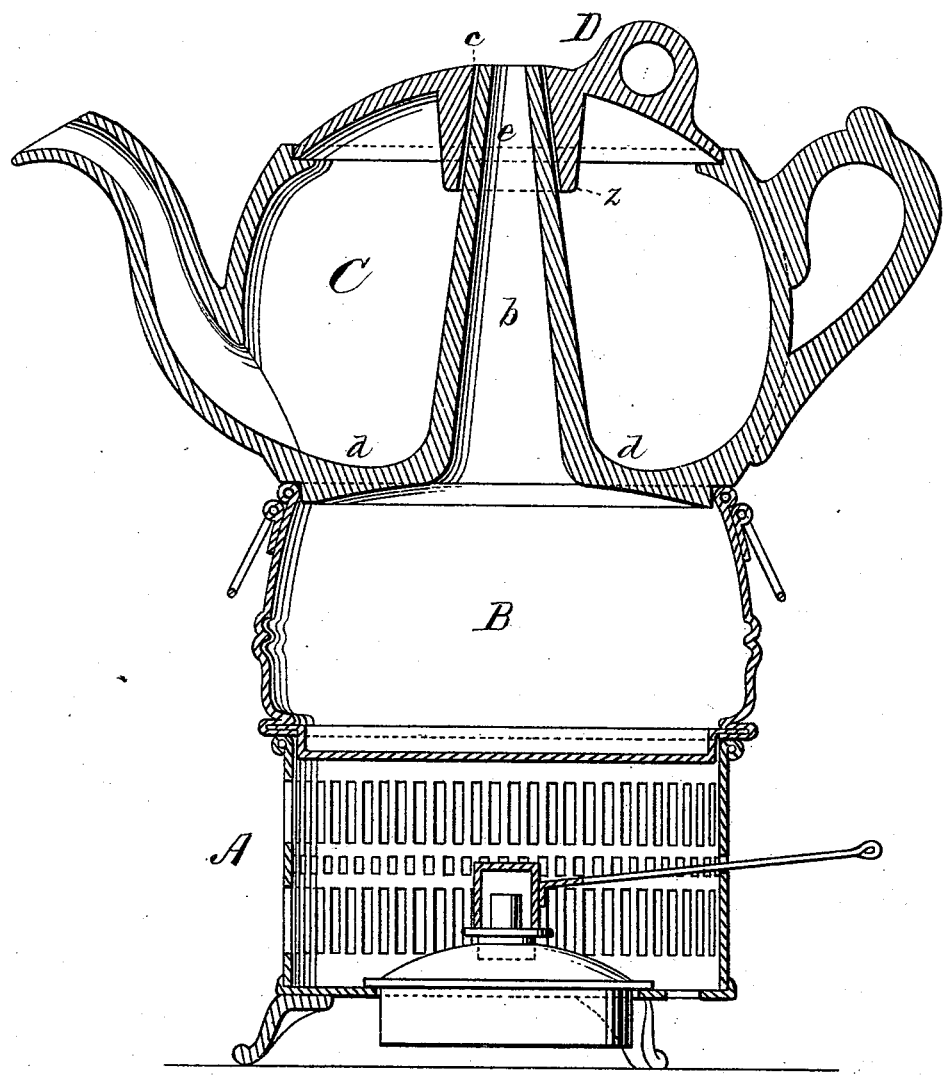

UNITED STATES PATENT OFFICE.

GEORGE W. WOODWARD, OF NEW YORK, N. Y., AND JOHN E. JEFFORDS, OF PHILADELPHIA, PENNSYLVANIA.

IMPROVEMENT IN TEA-STEEPING DEVICES.

Specification forming part of Letters Patent No. 186,656, dated January 23, 1877; application filed December 2, 1876.

*To all whom it may concern:*

Be it known that we, GEORGE W. WOODWARD, of New York, in the State of New York, and JOHN E. JEFFORDS, of Philadelphia, in the county of Philadelphia and State of Pennsylvania, have invented a new and valuable Improvement in Tea-Steeping Devices; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical central section of the tea-pot and apparatus.

This invention has relation to means for steeping tea without boiling it; and it consists in the construction and novel arrangement of the tea-pot, having an open steam flue or tube extending from the bottom through the top, and, in connection therewith, of a heating device or base supporting an intermediate boiler, upon or over which the tea-pot is designed to be placed, as hereinafter fully shown and described.

In the accompanying drawings, the letter A designates the metallic heater or base. This may be a gas or other stove, or it may be a spirit-heater, as illustrated in the drawings. It should be provided with a mouth or marginal seat for the reception of the boiler B, which is supported thereon. This vessel is made of metal, and designed to contain water, and is located between the heater and the tea-pot. C represents the tea-pot, the base of which is designed to fit and rest on the boiler-margin, as shown in the drawings. Its bottom $a$ is provided with an upward, conical, tubular extension or pipe, $b$, which is open at both ends, and extends through the cover D of the pot, said cover being provided with an aperture, $c$, for the upper end of said tube. The tube is tapered upward in the form of a cone, whereof the aperture of the base is several times the diameter of that of the top, and it is proper to give the base $d$ of the pot a slight rise toward the lower end or mouth of said tube, as shown.

The heater being in operation, and the boiler and tea-pot in place, as set forth, the steam generated in the boiler will escape through the tube $b$, at the same time assisting in heating the water in the pot C. In this manner the tea is easily steeped without being boiled and its strength thereby retained.

The end $e$ of the tube $b$, which projects through the aperture $c$ of the cover, engages with an annular lug, $z$, formed on the same around said aperture, and serves an excellent purpose in retaining the latter in position when the tea-pot is inclined or tipped in serving, the cover then resting by the full depth of its lug on the cone.

The tea-pot and boiler can be used without a specially-constructed heater, the boiler being placed on a stove or range, so as to bring it in contact with the heat.

What we claim as our invention, and desire to secure by Letters Patent, is—

1. The tea-steeping apparatus herein described, consisting of a tea-pot having a perforated lid, and an open conical flue extending from its base through the perforation in said lid, a heater, and an intermediate metallic boiler, substantially as specified.

2. A tea-pot having an open conical flue or pipe, $b$, extending upward from its base, and, in connection therewith, the cover, having an aperture, $c$, surrounded by an annular lug, $z$, designed to engage with the upper end of said flue or pipe, substantially as specified.

In testimony that we claim the above we have hereunto subscribed our names in the presence of two witnesses.

JOHN E. JEFFORDS.
GEO. W. WOODWARD.

Witnesses:
WALTER C. MASI,
HOWARD S. ZEVELY.